(12) United States Patent
Lin et al.

(10) Patent No.: US 12,126,276 B2
(45) Date of Patent: Oct. 22, 2024

(54) POWER CONVERTER AND ELECTRIC APPARATUS

(71) Applicant: Nidec Corporation, Kyoto (JP)

(72) Inventors: Ming-Tsan Lin, Taipei (TW); Yi-Shiang Ouyang, Taipei (TW); Hsin-Chang Yu, Taipei (TW)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/767,473

(22) PCT Filed: Sep. 30, 2020

(86) PCT No.: PCT/JP2020/037352
§ 371 (c)(1),
(2) Date: Apr. 8, 2022

(87) PCT Pub. No.: WO2021/085026
PCT Pub. Date: May 6, 2021

(65) Prior Publication Data
US 2024/0072685 A1    Feb. 29, 2024

(30) Foreign Application Priority Data
Oct. 29, 2019   (CN) .......................... 201911036259.0

(51) Int. Cl.
| H02M 1/00 | (2007.01) |
| H02M 3/155 | (2006.01) |
| H02M 7/5387 | (2007.01) |
| H02P 27/08 | (2006.01) |

(52) U.S. Cl.
CPC ....... *H02M 7/53871* (2013.01); *H02M 1/007* (2021.05); *H02M 3/155* (2013.01); *H02P 27/08* (2013.01); *H02M 1/0048* (2021.05)

(58) Field of Classification Search
CPC .............. H02M 1/0048; H02M 1/007; H02M 7/53871; H02P 27/08
USPC ..... 307/82; 363/15, 16, 17, 34, 98, 131, 132
See application file for complete search history.

(56) References Cited

U.S. PATENT DOCUMENTS

| 6,060,859 | A | * | 5/2000 | Jonokuchi | ................. | B60L 3/06 318/811 |
| 2004/0041404 | A1 | * | 3/2004 | McConnell | ............... | H02J 3/32 290/52 |
| 2004/0124807 | A1 | * | 7/2004 | Nakata | ................. | H02P 29/026 318/801 |
| 2009/0121669 | A1 | * | 5/2009 | Hanada | ................... | B60L 50/60 318/504 |
| 2009/0160380 | A1 | * | 6/2009 | Yamada | .................. | B60L 15/20 318/400.15 |

(Continued)

*Primary Examiner* — William Hernandez
(74) *Attorney, Agent, or Firm* — Keating & Bennett, LLP

(57) ABSTRACT

A power converter to supply power to each phase of a three-phase motor includes a booster circuit connected to a DC power supply to boost an input voltage input from the DC power supply in response to a pulse width modulation boosting signal, an inverter connected to the booster circuit and including a three-phase switching circuit including switches, and an output connected to the three-phase switching circuit to supply power to each phase of the three-phase motor, and a controller to output the pulse width modulation boosting signal to the booster circuit and output the pulse width modulation boosting signal to the booster circuit when detecting that the booster circuit is in a boosted state.

8 Claims, 6 Drawing Sheets

(56) References Cited

U.S. PATENT DOCUMENTS

2009/0289583 A1\* 11/2009 Yoshida .................. H02K 9/18
903/906

\* cited by examiner though FIG. 9 illustrates signals a, b, and c for controlling three upper-arm switching elements $T_a$, $T_b$, and $T_c$ of an inverter 801 in FIG. 8, respectively, FIG. 9 does not
POWER CONVERTER AND ELECTRIC APPARATUS

CROSS-REFERENCE TO RELATED APPLICATIONS

This is a U.S. national stage of application No. PCT/JP2020/037352, filed on Sep. 30, 2020, and with priority under 35 U.S.C. § 119(a) and 35 U.S.C. § 365(b) being claimed from Chinese Patent Application No. 201911036259.0, filed on Oct. 29, 2019, the entire disclosures of which are hereby incorporated herein by reference.

1. FIELD OF THE INVENTION

The present disclosure relates to electrical machines.

2. BACKGROUND

Some applications of a DC-AC inverter require an output voltage of the inverter to be higher than an input supply voltage. Thus, to increase the output voltage of the inverter, a boost converter is required to be added to a preceding stage of the inverter to increase a direct current link (DC BUS) voltage of the inverter. Unfortunately, adding the boost converter causes an inevitable increase in circuit loss, and the efficiency of the boost converter decreases.

Conventionally, several solutions are proposed.

The first solution achieves an object of improving motor efficiency as follows: a conventional boost converter is used between a three-phase full-bridge rectifier and a smoothing capacitor to increase a DC link voltage of the smoothing capacitor; the three-phase full-bridge inverter further modulates and outputs a three-phase AC voltage to drive a motor; and an output voltage of the boost converter is determined based on an operating condition of the motor.

The second solution uses a segmented boost converter circuit architecture, and when an AC motor needs to exceed a rated rotation speed, a drive apparatus needs to output a higher voltage. Thus, an object of increasing output voltage is achieved by using a boost converter to boost a DC link voltage of an inverter, and an object of improving operation efficiency of the AC motor is achieved by controlling the boost converter to operate in three types of operation modes in accordance with a rotation speed and a load requirement of the AC motor, and outputting an appropriate voltage.

The third solution is as follows: an amplitude modulation (PAM) method is used for an inverter to generate three-phase AC power supply at a variable frequency in a six-step square wave voltage form; and output voltage amplitude is controlled by a boost converter. Six-step square wave modulation changes a switching state of switches in six types in one power supply period, so that switching loss of the switches can be greatly reduced to improve efficiency of a driver.

The fourth solution achieves an object of reducing the number of switching of a power switch to reduce switching loss by using space vector pulse width modulation (SVPWM). For example, conventional SVPWM is implemented such that a waveform of a three-phase pulse width modulation (PWM) signal of one cycle is divided into seven stages (i.e., a seven-stage SVPWM switching method) to cause the switch to be switched six times for PWM per cycle. Alternatively, a three-phase PWM waveform of one cycle is divided into five segments by a five-segment SVPWM switching method, and switching is shared four times for PWM in each cycle to enable the switching loss to be reduced to ⅓ as compared with a seven-segment SVPWM switching method. Alternatively, the PWM waveform is changed from a symmetric expression to an asymmetric expression by using a four-stage asymmetric SVPWM switching method. This solution facilitates current sampling, but PWM in each cycle similarly causes the switch to be switched four times, and thus this solution does not further reduce the switching loss as compared with the five-stage system.

The fifth solution uses a combined SVPWM modulation method, and uses a different SVPWM switching method depending on rotation speed (stator frequency) of an AC motor and a voltage requirement. For example, when the stator frequency of the AC motor is located in a low frequency band, using a half-frequency SVPWM method enables the switching loss to be reduced to ½ as compared with the seven-stage SVPWM switching method. When the stator frequency of the AC motor is located in a medium-low frequency band, using a flat-top SVPWM method enables the switching loss to be reduced by ⅓. When the stator frequency of the AC motor is located in a medium-high frequency band, the seven-stage SVPWM method is used. When the stator frequency of the AC motor is located in a high frequency band, using an FFC SVPWM method minimizes the switching loss. Power loss of an inverter in the above methods in four types generally decreases in the following order: the seven-stage SVPWM, the flat-top SVPWM, the half-frequency SVPWM, and the FFC SVPWM, so that various SVPWM switching methods can be changed depending on various operation conditions, and switching loss of a driver can be reduced to improve efficiency.

Hereinafter, an SVPWM switching method will be described using the seven-stage SVPWM switching method as an example. FIG. 8 is a schematic circuit diagram in which a general three-phase inverter is connected to a three-phase motor, FIG. 9 is a schematic waveform diagram of a conventional seven-stage SVPWM switching method, and FIG. 10 is a schematic diagram of a space voltage vector. Although FIG. 9 illustrates signals a, b, and c for controlling three upper-arm switching elements $T_a$, $T_b$, and $T_c$ of an inverter 801 in FIG. 8, respectively, FIG. 9 does not illustrate signals a', b', and c' for controlling three lower-arm switching elements $T_a'$, $T_b'$ and $T_c'$, respectively, the signals a', b', and c' being inverted from the signals a, b, and c, respectively.

The six switching elements $T_a$, $T_b$, $T_c$, $T_a'$, $T_b'$, and $T_c'$ are controlled by the PWM signals a, b, c, a', b', and c', respectively, and each of which turns on an upper arm or a lower arm of corresponding one of arms to output voltage of one of phases corresponding to three phases A, B, and C of a three-phase motor 802. Assuming that the PWM signals each have a high level indicated as '1' and a low level indicated as '0', (abc) corresponding to the signals a, b and c indicates a voltage vector in a voltage space, and six different space voltage vectors $V_1$ to $V_6$ and two zero voltage vectors $V_0$ and $V_7$ illustrated in FIG. 10 can be generated.

Here, the six space voltage vectors each differ by 60°, and divide a voltage plane into six sections. To generate a smooth rotating magnetic field in the three-phase AC motor, the three-phase inverter needs to output a smooth circumferential voltage vector. In this case, a voltage vector of each section needs to be generated. Using a combination of two voltage vectors at respective ends of this section enables a desired circumferential voltage vector to be obtained from a concept of average voltage. When synthetic voltage of $V_1$ and $V_2$ is taken as an example, output of equivalent average voltage is as shown in Expression 1, where output time of the voltage $V_1$ is T1, output time of voltage $V_2$ is $T_2$, and output time of the voltage $V_0$ or $V_7$ is $T_0$.

$$V_{out} = \frac{T_1}{T}V_1 + \frac{T_2}{T}V_2 + \frac{T_0}{T}V_{0(7)} \qquad \text{Mathematical Expression 1}$$

Here, the PWM cycle is expressed as $T=T_1+T_2+T_0$.

As can be seen from the above expression, the synthetic voltage can be changed in phase by adjusting a ratio between time $T_1$ and time $T_2$, and the output voltage can be changed in magnitude by changing length of time $T_0$. Thus, the conventional SVPWM technique controls a switching state of six power switches in an inverter, thereby combining voltages each having a phase and an amplitude required for the space voltage vector.

It should be noted that the foregoing descriptions of the technical background are merely for facilitating clear and complete description of the technical solutions of the present application, and for facilitating understanding of those skilled in the art and description. It is incorrect to interpret that the foregoing technical solutions are well known to those skilled in the art because they are described in the part of the background art of the present application.

SUMMARY

The inventors of the present application have discovered that the above-described first solution improves only motor efficiency, and does not solve a problem of a decrease in efficiency of the entire driver that is caused after adding a boost converter. The above-described second solution can improve the efficiency of an AC motor, but does not solve a problem of an increase in driver loss after increasing the number and complexity of circuit elements and increasing the number of boost converters. The above-described third solution includes large odd harmonics and generates a large harmonic current to cause noise and vibration of an AC motor, and thus is not applicable to an application field with a high demand for preventing noise and vibration. Although the above-described fourth and fifth solutions can reduce switching loss, the switching loss can be only partially reduced, and a problem of increasing current harmonics and reducing efficiency of the entire driver caused after adding a boost converter cannot be effectively solved.

According to an example embodiment of the present disclosure, a power converter that supplies power to each phase of a three-phase motor includes a booster circuit connected to a DC power supply to boost an input voltage received from the DC power supply in response to a pulse width modulation boosting signal, and an inverter connected to the booster circuit and including a three-phase switching circuit including a plurality of switches, the inverter further including an output connected to the three-phase switching circuit to supply power to each phase of the three-phase motor, and a controller to output the pulse width modulation boosting signal to the booster circuit and to detect the input voltage boosted. When the booster circuit is in a boosted state, a pulse width modulation switching signal to cause no two-phase switch in the three-phase switching circuit to be turned on in one pulse width modulation cycle is output to the inverter.

At least one example embodiment of the present disclosure is configured such that when the controller detects that the booster circuit is in a boosted state, the controller controls on and off of a switch of another one phase in the switching circuit in one pulse width modulation cycle.

At least one example embodiment of the present disclosure is configured such that the three-phase switching circuit includes six switches including three arms of a bridge circuit in pairs, the three arms correspond to three respective phases of the three-phase motor, two switches of each arm define an upper arm and a lower arm of the arm, and when the controller detects that the booster circuit is in a boosted state, the controller causes the upper arm and the lower arm of one arm of the three arms to be turned on and off in one pulse width modulation cycle, and causes the upper arm and the lower arm of each of the other two arms of the three arms not to be turned on in one pulse width modulation cycle, and then the controller causes not only the upper arm of one of the other two arms to be turned on and the lower arm of the one to be turned off, but also the upper arm of the other one of the other two arms to be turned off and the lower arm of the other one to be turned on.

At least one example embodiment of the present disclosure is configured such that, in one pulse width modulation cycle, the controller once controls on and off of the upper arm and the lower arm of the one arm.

At least one example embodiment of the present disclosure is configured such that the controller sets a duty ratio of the pulse width modulation switching signal based on output voltage of the booster circuit, and once controls on and off of the upper arm and the lower arm of the arm as described above based on the duty ratio.

At least one example embodiment of the present disclosure is configured such that the controller includes a voltage controller and a PWM signal generator, the voltage controller determines a duty ratio of the pulse width modulation boosting signal based on output voltage and a target voltage of the booster circuit, the target voltage is obtained by multiplying a preset target duty ratio by input voltage received from the DC power supply, and the PWM signal generator generates the pulse width modulation boosting signal based on the duty ratio and provides the pulse width modulation boosting signal to the booster circuit to control boosting of the booster circuit.

At least one example embodiment of the present disclosure is configured such that the power converter further includes a DC power supply that provides a DC voltage to the booster circuit.

Another example embodiment of the present disclosure provides an electric apparatus that includes the power converter and a three-phase motor, the power converter supplying power to each phase of the three-phase motor.

Specified example embodiments of the present disclosure will be disclosed in detail with reference to the following description and accompanying drawings that illustrate how the principles of the present disclosure can be applied. It should be understood that the example embodiments of the present disclosure are not thereby limited in scope. The example embodiments of the present disclosure include many changes, modifications, and equivalents within the scope of claims appended.

Elements and features described in one drawing or one example embodiment of the example embodiments of the present disclosure may be combined with elements and features shown in one or more other drawings or example embodiments. Similar reference signs in the drawings indicate corresponding components in several drawings and can be used to indicate corresponding components used in one or more example embodiments.

The accompanying drawings are used to provide a further understanding of the example embodiments of the present disclosure while constituting a part of the specification, are used to illustrate the example embodiments of the present disclosure, and the accompanying drawings also describes the principles of the present disclosure together with the specification. The drawings in the following description are apparently and merely some examples of the present disclosure, and those skilled in the art may obtain other drawings based on these drawings without creative efforts.

The above and other elements, features, steps, characteristics and advantages of the present disclosure will become more apparent from the following detailed description of the example embodiments with reference to the attached drawings.

DETAILED DESCRIPTION

The foregoing and other features of example embodiments of the present application will become apparent from the following description with reference to the accompanying drawings. Although specific example embodiments of the present application are specifically disclosed in the specification and the drawings and some of example embodiments in which the principles of the present application can be used are shown, it should be understood that the present application is not limited to the described example embodiments, but rather, the present application includes all modifications, changes, and equivalents that fall within the scope of claims appended.

The example embodiments of the present application are described in the terms of "first", "second", "upper", "lower" and the like, which are used to distinguish different elements from names, but that do not indicate a spatial placement, a time sequence, or the like of these elements, and these elements should not be limited by these terms. The term, "and/or", includes any one and all combinations of one or more of terms associated and listed. The terms, "comprising", "including", "having", and the like refer to presence of stated features, elements, elements, or components, but do not preclude presence or addition of one or more other features, elements, elements, or components.

The example embodiments of the present application are described in singular forms, "a", "the", and the like that include plural forms, and that should be understood in a broad sense as "a" or "a group", and are not limited to "one". The term, "the", should also be understood to include the singular and the plural, unless the context clearly shows otherwise. The term, "based on", should be understood as "at least partially based on" and the term, "based on", should be understood as "at least partially based on".

Figure 1:
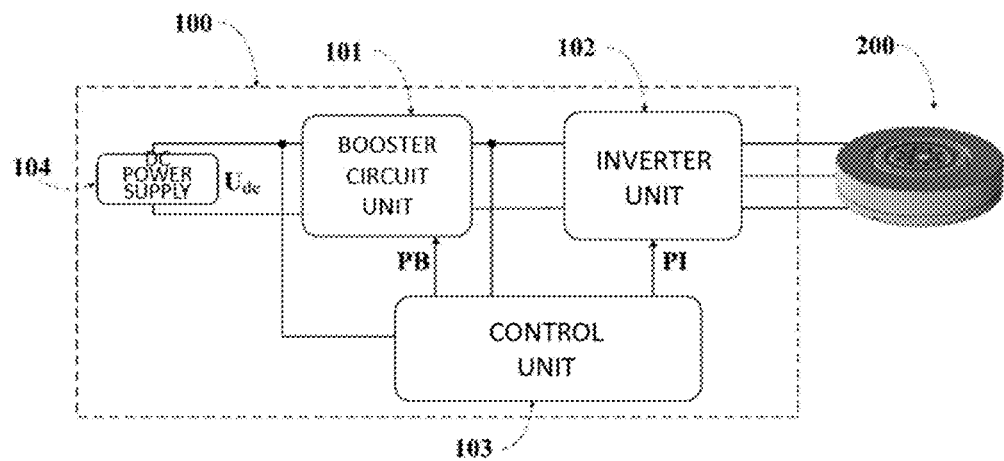
FIG. 1 is a schematic diagram of a modularized power converter according to an example embodiment of the present application.

A first example embodiment of the present application provides a power converter. FIG. 1 is a modularized schematic diagram of the power converter according to an example embodiment of the present application, and FIG. 2 is a circuit schematic diagram of a part of the power converter illustrated in FIG. 1.

As illustrated in FIG. 1, the example embodiment of the present application provides a power converter 100 that may include a booster circuit 101, an inverter 102, a controller 103, and a DC power supply 104, and the power converter 100 provides three-phase AC power to a three-phase motor 200. Here, the controller 103 can output a pulse width modulation boosting signal PB (hereinafter, abbreviated as a "boosting signal PB") to the booster circuit 101. The booster circuit 101 is connected to the DC power supply 104 to boost output voltage Udc of the DC power supply 104 based on the boosting signal PB from the controller 103, and can output the boosted voltage to the inverter 102.

Figure 2:
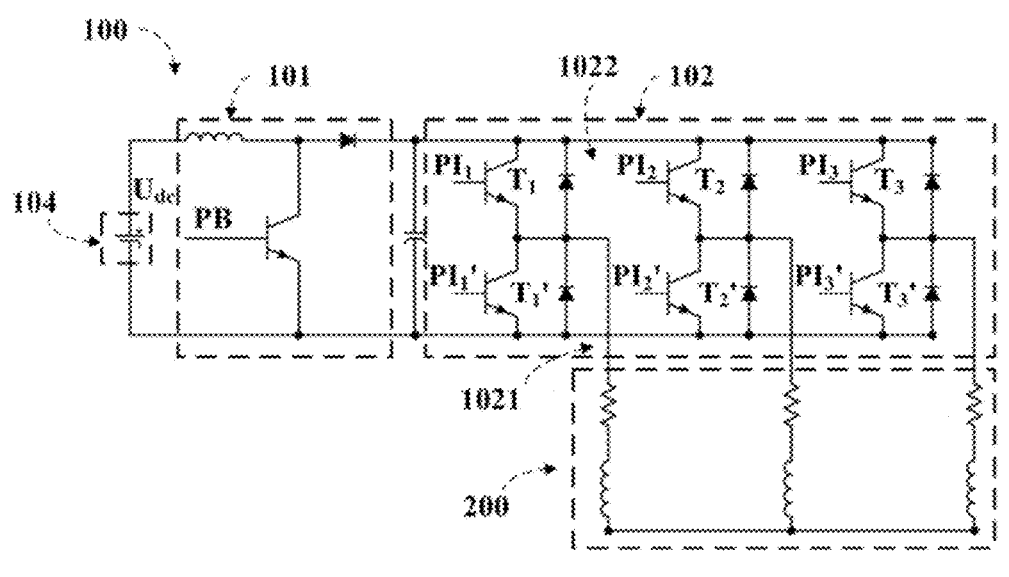
FIG. 2 is a circuit diagram of a portion of the power converter illustrated in FIG. 1.

As illustrated in FIG. 2, the inverter 102 may include an output assembly 1021 and a three-phase switching circuit 1022. The three-phase switching circuit 1022 may be composed of a plurality of switching elements, and the output assembly 1021 is connected to the three-phase switching circuit 1022 to supply power to each phase of the three-phase motor 200. The output assembly 1021 includes an electrical element such as a diode. Specifically, reference may be made to related techniques, and the present application is not limited to this configuration.

The example embodiment of the present disclosure provides the controller 103 that detects output voltage of the booster circuit 101. When the booster circuit 101 is in a boosted state, the controller 103 outputs a pulse width modulation switching signal PI (hereinafter abbreviated as "switching signal PI") to the inverter 102 to cause switching elements in two phases in the three-phase switching circuit 1022 not to be turned on in one pulse width modulation cycle (hereinafter abbreviated as "PWM cycle"), and causes a switching element in another one phase to be turned on and off in the PWM cycle. This configuration reduces the number of times of switching, so that switching loss is reduced as a whole.

As illustrated in FIG. 2, at least one example embodiment provides the three-phase switching circuit 1022 in which six switching elements can constitute a bridge circuit and are indicated as $T_1$ to $T_3$, and $T_1'$ to $T_3'$. $T_1$ and $T_1'$, the $T_2$ and $T_2'$, and $T_3$ and $T_3'$, are individually paired and constitute a first arm, a second arm, and a third arm of the bridge circuit, respectively, where $T_1$, $T_2$, and $T_3$ are each referred to as an upper arm, and $T_1'$, $T_2'$, and $T_3'$ are each referred to as a lower arm. The three arms of the bridge circuit correspond to the three phases of the three-phase motor 200, are controlled by the switching signal PI to supply power to each phase of the three-phase motor 200. Although FIG. 2 illustrates the three-phase switching circuit 1022 that includes the six switching elements, the present disclosure is not limited thereto. The switching circuit may include another number of switching elements to supply power to the three-phase motor. Although FIG. 2 illustrates the switching elements that are each indicated by a circuit symbol of a transistor, but the switching elements of the present application are not each limited to a transistor, and another electric element may constitute the switching elements.

Figure 3:
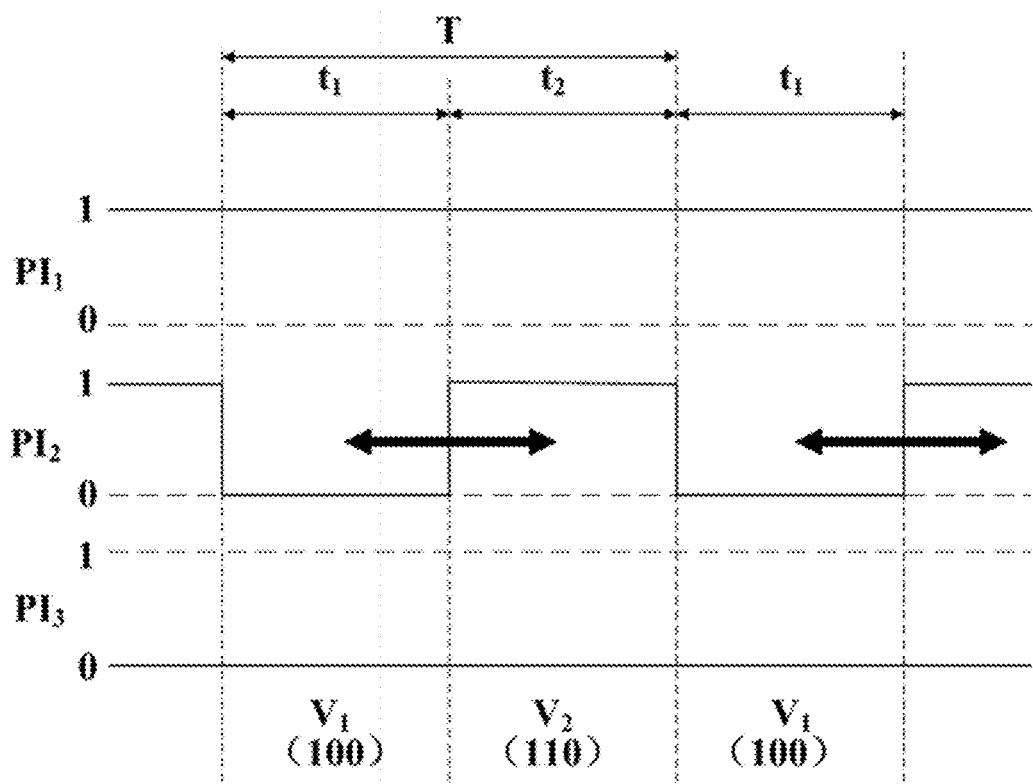
FIG. 3 is a timing diagram of a switching signal in a PWM cycle according to an example embodiment of the present application.
Figure 4:
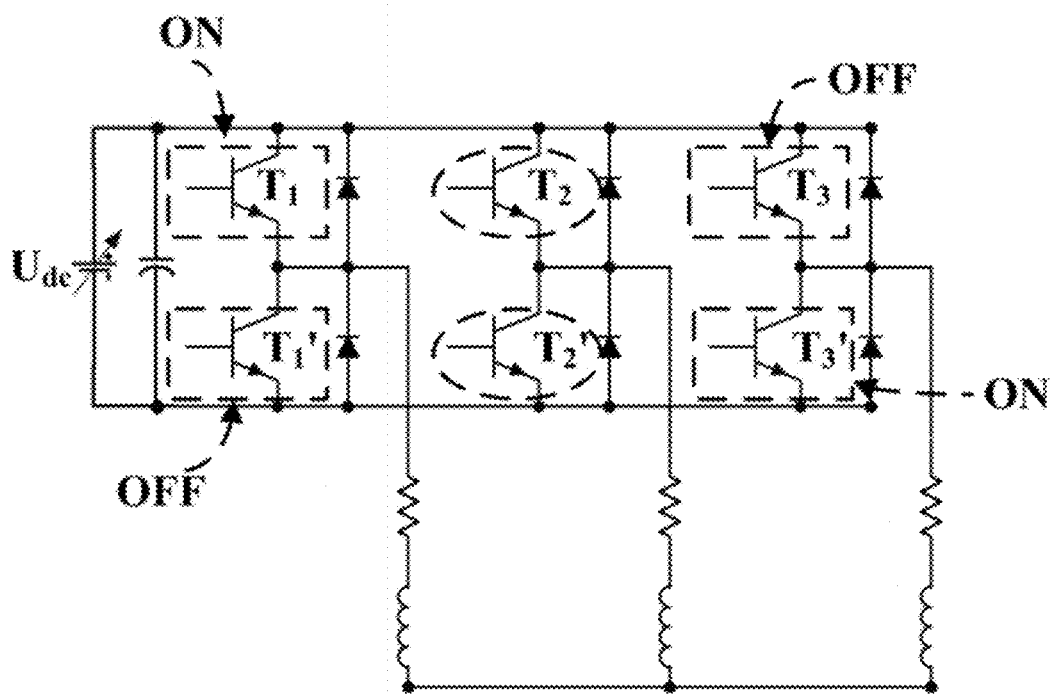
FIG. 4 is a diagram illustrating a switching state of each switching element when the switching element is controlled by the switching signal illustrated in FIG. 3.

FIG. 3 is a schematic diagram of switching signals $PI_1$ to $PI_3$ output from the controller 103 to the upper arms $T_1$, $T_2$, and $T_3$ of the inverter 102 in one PWM period T. FIG. 3 does not illustrate switching signals $PI_1'$ to $PI_3'$ that are output from the controller 103 to the lower arm $T_1'$, $T_2'$, and $T_3'$ of the inverter 102 and that are opposite in phase to the switching signals $PI_1$ to $PI_3$. FIG. 4 illustrates a switching state of each switching element when the switching elements $T_1$ to $T_3$, and $T_1'$ to $T_3'$ are controlled by the switching signals illustrated in FIG. 3.

Next, energization control performed by the controller 103 will be described with reference to FIGS. 2 to 4 as an example.

At least one example embodiment provides the controller 103 that outputs the switching signal PI (e.g., the switching signals PI1 to PI3 and the switching signals $PI_1'$ to $PI_3'$) to the three-phase switching circuit 1022 when detecting that the booster circuit 101 is in the boosted state. The switching signal PI is configured to perform control of allowing the upper arm and the lower arm of each of two arms in the three-phase switching circuit 1022 not to be turned on and off in one PWM cycle, and allowing the upper arm and the lower arm of the other arm to be turned on and off in this PWM cycle.

As illustrated in FIG. 3, the switching signal PI is a PWM signal, and a PWM cycle T is expressed as $T=t_1+t_2$. One PWM cycle T includes $PI_1$ that is always at a high level, $PI_3$ that is always at a low level, a duration $t_1$ in which $PI_2$ is at a low-level, and a duration $t_2$ in which $PI_2$ is at a high-level. In contrast, the one PWM cycle includes $PI_1'$ that is always at a low level, $PI_3'$ that is always at a high level, the duration $t_1$ in which $PI_2'$ is at a high-level, and the duration $t_2$ in which the $PI_2'$ is at a low-level. As illustrated in FIG. 4, the PWM cycle illustrated in FIG. 3 includes the upper arm $t_1$ that is always in an ON state (ON), the lower arm $t_1'$ that is always in an OFF state (OFF), the upper arm $T_3$ that is always in the OFF state (OFF), the lower arm $T_3'$ that is always in the ON state (ON), the upper arm $T_2$ that is switched to the ON state in the duration t1, and the lower arm $T_2'$ that is switched to the ON state in the duration $t_1$ and to the OFF state in the duration $T_2$. As a result, the PWM cycle includes the second arm (the upper arm $T_2$ is turned from off to on, and the lower arm $T_2'$ is turned from on to off) that is only switched, and the first arm (the upper arm $T_1$ is always turned on, the lower arm $T_1'$ is always turned off) and the third arm (the upper arm $T_3$ is always turned off, the lower arm $T_3'$ is always turned on) that are not switched. When a space voltage vector is expressed as $(PI_1PI_2PI_3)$, the PWM cycle illustrated in FIG. 3 includes the duration $t_1$ that is a duration of a space voltage vector $V_1$ (100), and the duration $t_2$ that is a duration of a space voltage vector $V_2$ (110). Then, output voltage of the inverter 102 changes from 0° to 60° in a vector space.

Similarly, another PWM cycle includes $PI_1$ that is always at a high level, $PI_2$ that is always at a low level, a duration $t_1$ in which the switching signal $PI_3$ is at a low-level, and a duration $t_2$ in which the switching signal $PI_3$ is at a high-level. In contrast, the other PWM cycle includes $PI_1'$ that is always at a low level, $PI_2'$ that is always at a high level, the duration $t_1$ in which $PI_3'$ is at a high-level, and the duration $t_2$ in which $PI_3'$ is at a low-level. Thus, the PWM cycle includes the upper arm $t_1$ that is always in the ON state (ON), the lower arm $t_1'$ that is always in the OFF state (OFF), the upper arm $T_2$ that is always in the OFF state (OFF), the lower arm $T_2'$ that is always in the ON state (ON), the upper arm $T_3$ that is in the OFF state in the duration $t_1$, and that is switched to the ON state in the duration $T_2$, and the lower arm $T_3'$ that is in the ON state in the duration $t_1$, and that is switched to the OFF state in the duration $T_2$. As a result, the PWM cycle includes the third arm (the upper arm $T_3$ is turned from off to on, and the lower arm $T_3'$ is turned from on to off) that is only switched, and the first arm (the upper arm $T_1$ is always turned on, the lower arm $T_1'$ is always turned off) and the second arm (the upper arm $T_2$ is always turned off, the lower arm $T_2'$ is always turned on) that are not switched. The PWM cycle includes $t_1$ that is the duration of the space voltage vector $V_1$ (100), and $t_2$ that is a duration of a space voltage vector V6 (101). Then, the output voltage of the inverter 102 changes from 300° to 360° in the vector space.

Similarly, yet another PWM cycle includes $PI_2$ that is always at a high level, $PI_3$ that is always at a low level, a duration $t_1$ in which $PI_1$ is at a low-level, and a duration $t_2$ in which $PI_1$ is at a high-level. In contrast, the yet other PWM cycle includes $PI_2'$ that is always at a low level, $PI_3'$ that is always at a high level, the duration $t_1$ in which $PI_1'$ is at a high-level, and the duration $t_2$ in which $PI_1'$ is at a low-level. Thus, the PWM cycle includes the upper arm $T_2$ that is always in the ON state (ON), the lower arm $T_2'$ that is always in the OFF state (OFF), the upper arm $T_3$ that is always in the OFF state (OFF), the lower arm $T_3'$ that is always in the ON state (ON), the upper arm $t_1$ that is in the OFF state in the duration t1, and that is switched to the ON state in the duration $T_2$, and the lower arm $t_1'$ that is in the ON state in the duration t1, and that is switched to the OFF state in the duration $T_2$. As a result, the one PWM cycle includes the first arm (the upper arm $T_1$ is turned from off to on, and the lower arm $T_1'$ is turned from on to off) that is only switched, and the second arm (the upper arm $T_2$ is always turned on, the lower arm $T_2'$ is always turned off) and the third arm (the upper arm $T_3$ is always turned off, the lower arm $T_3'$ is always turned on) that are not switched. The PWM cycle includes the duration $t_1$ that is a duration of a space voltage vector $V_3$ (010), and the duration $t_2$ that is the duration of the space voltage vector $V_2$ (110). Then, the output voltage of the inverter 102 changes from 60° to 120° in the vector space.

Similarly, yet another PWM cycle includes the switching signal $PI_1$ that is always at a low level, the switching signal $PI_3$ that is always at a high level, a duration $t_1$ in which the switching signal $PI_2$ is at a low-level, and a duration $t_2$ in which the switching signal $PI_2$ is at a high-level. In contrast, the yet other PWM cycle includes $PI_1'$ that is always at a high level, $PI_3'$ that is always at a low level, the duration $t_1$ in which $PI_2'$ is at a high-level, and the duration $t_2$ in which $PI_2'$ is at a low-level. Thus, the PWM cycle includes the upper arm $t_1$ that is always in the OFF state (OFF), the lower arm $t_1'$ that is always in the ON state (ON), the upper arm $T_3$ that is always in the ON state (ON), the lower arm $T_3'$ that is always in the OFF state (OFF), the upper arm $T_2$ that is in the OFF state in the duration $t_1$, and that is switched to the ON state in the duration $T_2$, and the lower arm $T_2'$ that is in the ON state in the duration $t_1$, and that is switched to the OFF state in the duration $T_2$. As a result, the PWM cycle includes the second arm (the upper arm $T_2$ is turned from off to on, and the lower arm $T_2'$ is turned from on to off) that is only switched, and the first arm (the upper arm $T_1$ is always turned on, the lower arm $T_1'$ is always turned off) and the third arm (the upper arm $T_3$ is always turned off, the lower arm $T_3'$ is always turned on) that are not switched. The PWM cycle includes the duration $t_1$ that is a duration of a space voltage vector $V_5$ (001), and the duration $t_2$ that is a duration of a space voltage vector $V_4$ (011). Then, the output voltage of the inverter 102 changes from 180° to 240° in the vector space.

Similarly, yet another PWM cycle includes $PI_1$ that is always at a low level, $PI_2$ that is always at a high level, a duration $t_1$ in which $PI_3$ is at a low-level, and a duration $t_2$ in which $PI_3$ is at a high-level. In contrast, the yet other PWM cycle includes $PI_1'$ that is always at a high level, $PI_2'$ that is always at a low level, the duration $t_1$ in which $PI_3'$ is at a high-level, and the duration $t_2$ in which $PI_3'$ is at a low-level. Thus, the PWM cycle includes the upper arm $t_1$ that is always in the OFF state (OFF), the lower arm $t_1'$ that is always in the ON state (ON), the upper arm $T_2$ that is always in the ON state (ON), the lower arm $T_2'$ that is always in the OFF state (OFF), the upper arm $T_3$ that is in the OFF state in the duration $t_1$, and that is switched to the ON state in the duration $T_2$, and the lower arm $T_3'$ that is in the ON state in the duration $t_1$, and that is switched to the OFF state in the duration $T_2$. As a result, the PWM cycle includes the third arm (the upper arm $T_3$ is turned from off to on, and the lower arm $T_3'$ is turned from on to off) that is only switched, and the first arm (the upper arm $T_1$ is always turned off, the lower arm $T_1'$ is always turned on) and the second arm (the upper arm $T_2$ is always turned on, the lower arm $T_2'$ is always turned off) that are not switched. The PWM cycle includes the duration $t_1$ that is a duration of the space voltage vector $V_3$ (010), and the duration $t_2$ that is a duration of the space voltage vector $V_4$ (011). Then, the output voltage of the inverter 102 changes from 120° to 180° in the vector space.

Similarly, yet another two PWM cycles each include $PI_1$ that is always at a low level, $PI_3$ that is always at a high level, a duration $t_1$ in which $PI_1$ is at a low-level, and a duration $t_2$ in which $PI_1$ is at a high-level. In contrast, the yet other two PWM cycles each include $PI_1'$ that is always at a high level, $PI_3'$ that is always at a low level, the duration $t_1$ in which $PI_1'$ is at a high-level, and the duration $t_2$ in which the switching signal $PI_1'$ is at a low-level. Thus, the PWM cycle includes the upper arm $T_2$ that is always in the OFF state (OFF), the lower arm $T_2'$ that is always in the ON state (ON), the upper arm $T_3$ that is always in the ON state (ON), the lower arm $T_3'$ that is always in the OFF state (OFF), the upper arm $t_1$ that is in the OFF state in the duration $t_1$, and that is switched to the ON state in the duration $T_2$, and the lower arm $t_1'$ that is in the ON state in the duration $t_1$, and that is switched to the OFF state in the duration $T_2$. As a result, the one PWM cycle includes the first arm (the upper arm $T_1$ is turned from off to on, and the lower arm $T_1'$ is turned from on to off) that is only switched, and the second arm (the upper arm $T_2$ is always turned off, the lower arm $T_2'$ is always turned on) and the third arm (the upper arm $T_3$ is always turned on, the lower arm $T_3'$ is always turned off) that are not switched. The PWM cycle includes the duration $t_1$ that is a duration of the space voltage vector $V_5$ (001), and the duration $t_2$ that is a duration of the space voltage vector $V_6$ (101). Then, the output voltage of the inverter 102 changes from 240° to 300° in the vector space.

Figure 9:
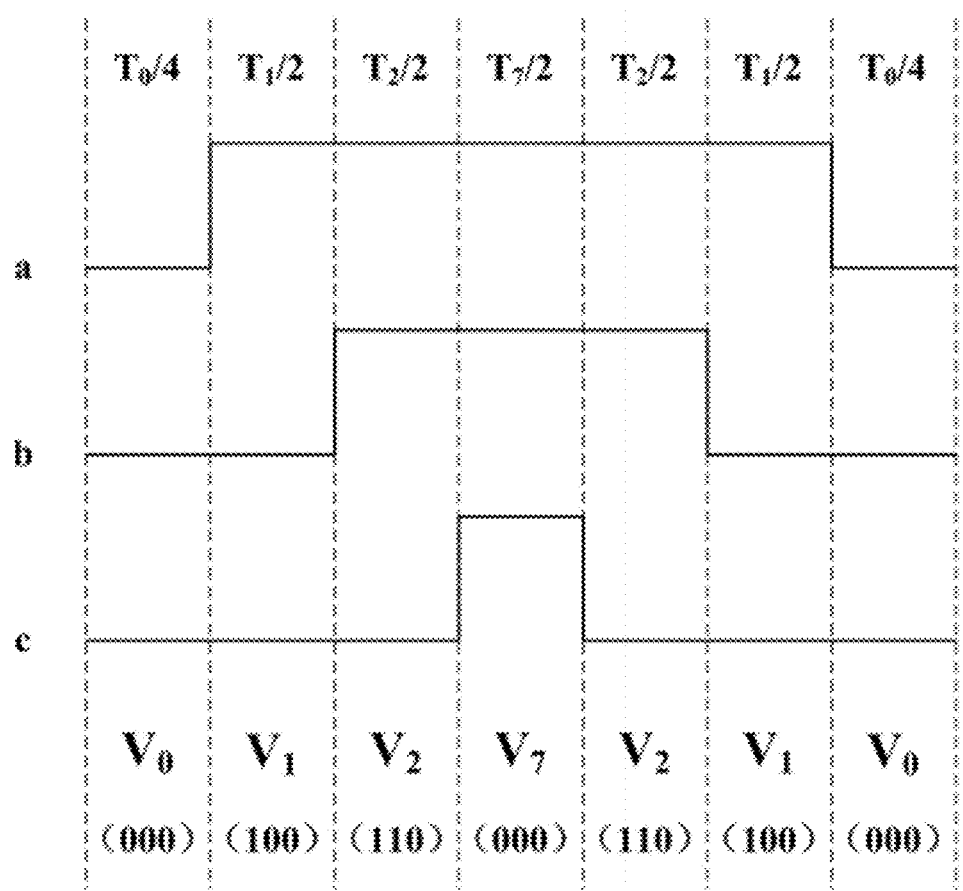
FIG. 9 is a schematic waveform diagram of a conventional seven-stage SVPWM switching method.
Figure 10:
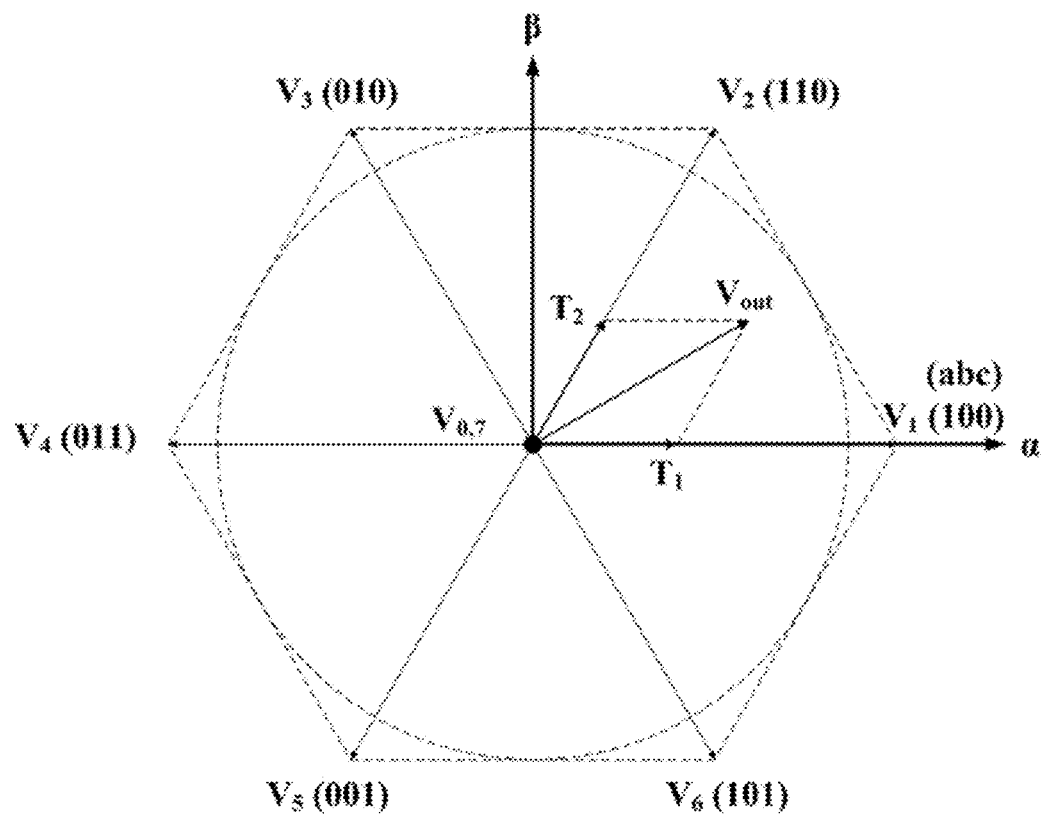
FIG. 10 is a diagram illustrating a space voltage vector of a three-phase inverter.

The configuration in the present application described above enables switching loss of an inverter to be reduced to ⅔ as compared with the conventional seven-stage SVPWM control method due to reasons as follows: the conventional seven-stage SVPWM control method requires a switch to be switched six times in one PWM cycle, and allows zero voltage vectors (as illustrated in FIG. 9, zero voltage vectors V0 and V7) to exist, thereby requiring a switch of the zero voltage vectors to be switched four times; and the present application allows the switch to be switched only once in one PWM cycle, and includes no zero voltage vector in one PWM cycle because of belonging to the two-stage SVPWM control method.

Figure 5:
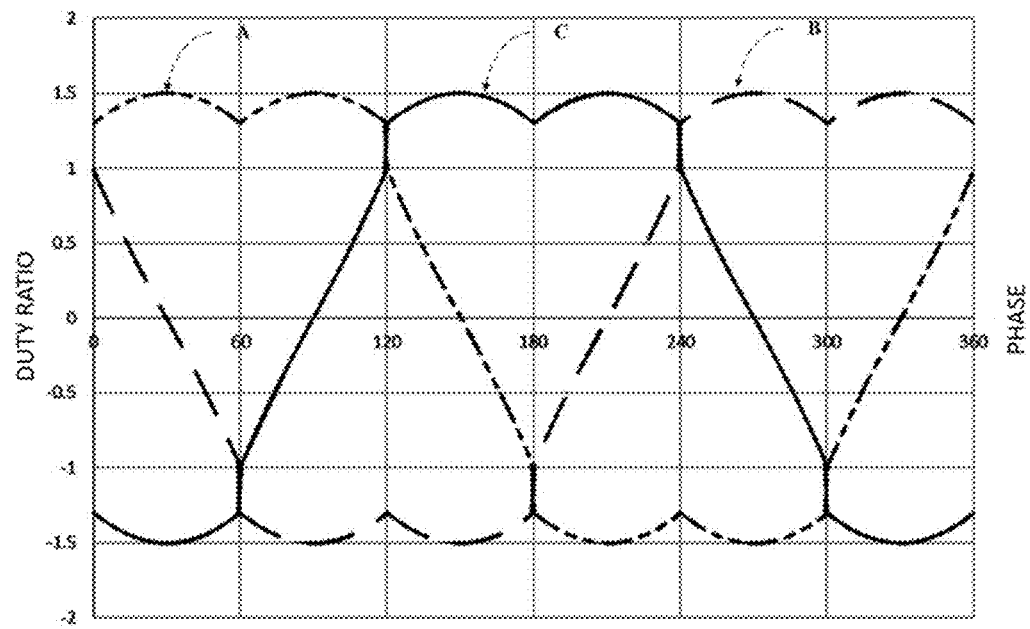
FIG. 5 is a diagram illustrating a relationship between an on-time and a phase for each phase of a three-phase switching circuit according to an example embodiment of the present application.

FIG. 5 is a diagram illustrating a relationship between conduction time and a phase for each of phases of a three-phase switching circuit, the phases being output from the power converter of the present application controlled by the two-stage SVPWM control method. As illustrated in FIG. 5, the A-phase corresponds to, for example, the first arm (the upper arm $T_1$ and the lower arm $T_1'$), the B-phase corresponds to, for example, the second arm (the upper arm $T_2$ and the lower arm $T_2'$), and the C-phase corresponds to, for example, the third arm (the upper arm $T_3$ and the lower arm $T_3'$). FIG. 5 will be described below using a section from 0° to 60° in the vector space as an example. FIG. 5 shows that the section from 0° to 60° in the vector space includes the A-phase in which a duty ratio is always more than 1, the upper arm $T_1$ is always turned on in the entire PWM cycle, and the lower arm $T_1'$ is always turned off in the entire PWM cycle. FIG. 5 shows that the section includes the C-phase in which a duty ratio is always less than −1, the upper arm $T_3$ is always turned off in the entire PWM cycle, and the lower arm $T_3'$ is always turned on in the entire PWM cycle. When the B-phase has a duty ratio between −1 and 1 and a phase of 0°, the upper arm $T_2$ is turned on at the duty ratio of 1, and the upper arm $T_2$ and the lower arm $T_2'$ are each switched between ON and OFF or switching between ON and OFF of each of the upper arm $T_2$ and the lower arm $T_2'$ is performed, at the duty ratio smaller than 1, and then an actual PWM duty (DUTY_PWM) has a functional relationship, such as DUTY_PWM=0.5×DUTY+0.5. For example, when the phase is 30°, the duty (DUTY) is 0, and the actual PWM duty (DUTY_PWM) is 0.5. This indicates that the upper and lower arms are each turned on for 50% of the PWM cycle. Even when the upper arm in the A-phase and the lower arm in the C-phase are continuously turned on, output voltage of the inverter cannot be increased. Alternatively, the booster circuit can increase direct-current link voltage of the inverter, and a voltage value is proportional to an absolute value of an on-time ratio of the A-phase or the C-phase, so that the inverter outputs sinusoidal voltage corresponding to required voltage. Amplitude of the output voltage of the inverter can be determined by control of the booster circuit, so that a phase of the space voltage vector can be determined only by controlling the on-time ratio of upper and lower arms of a predetermined single-phase switch in the inverter during the PWM cycle, and thus, switching loss of an inverter switch can be reduced to ⅔.

Figure 6:
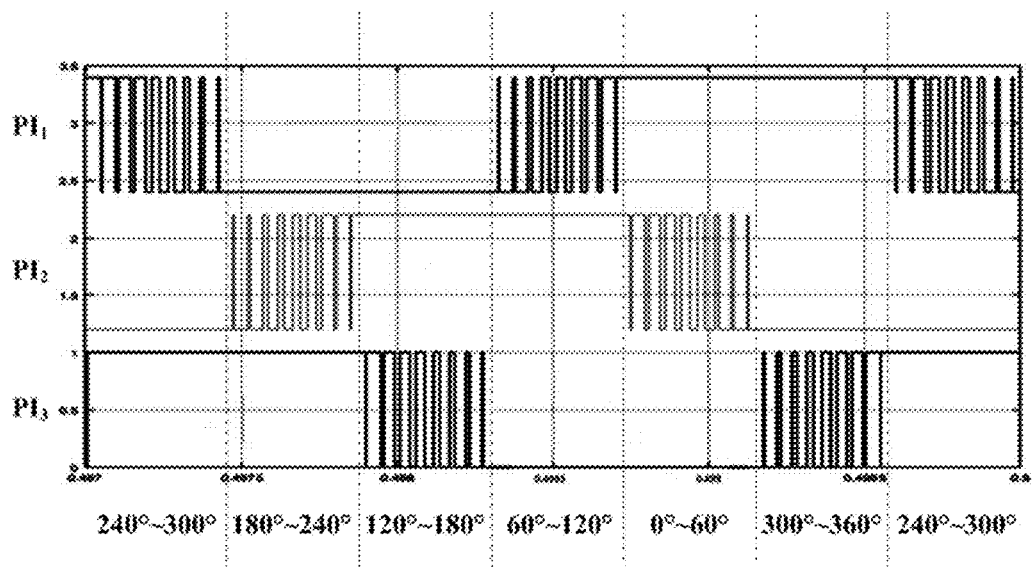
FIG. 6 is a timing diagram of a switching signal over a certain period of time according to an example embodiment of the present application.

FIG. 6 is a diagram illustrating an example of the switching signals $PI_1$ to $PI_3$, and FIG. 6 does not illustrate the switching signals $PI_1'$ to $PI_3'$ that are inverted from the switching signals $PI_1$ to $PI_3$, respectively. Control of the switching signals $PI_1$ to $PI_3$ and the switching signals $PI_1'$ to $PI_3'$ causes the output voltage of the inverter 102 to continuously change in phase in the vector space. The booster circuit 101 is capable of generating variable direct-current link voltage, and the inverter 102 is capable of outputting voltage that satisfies an amplitude requirement of the three-phase motor without outputting a zero voltage vector. Thus, a smooth circumferential voltage vector can be output to reduce current harmonics only by changing an output time ratio of two different non-zero voltage vectors.

Figure 7:
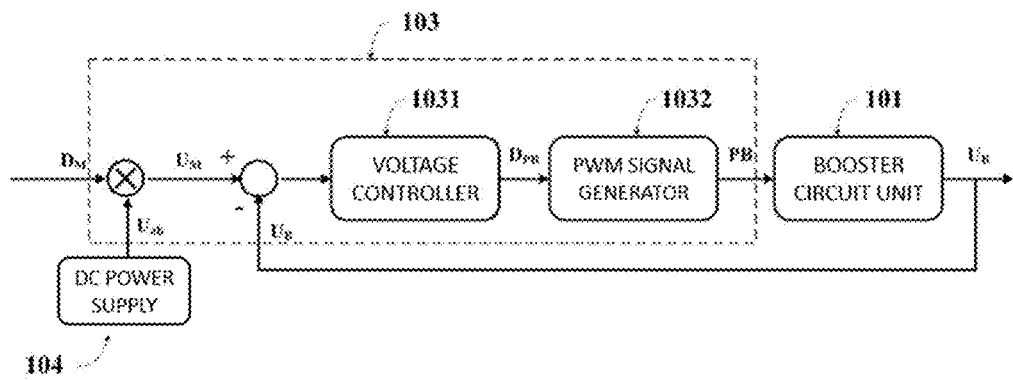
FIG. 7 is a diagram illustrating a circuit in which a controller generates a boosting signal according to an example embodiment of the present application.
Figure 8:
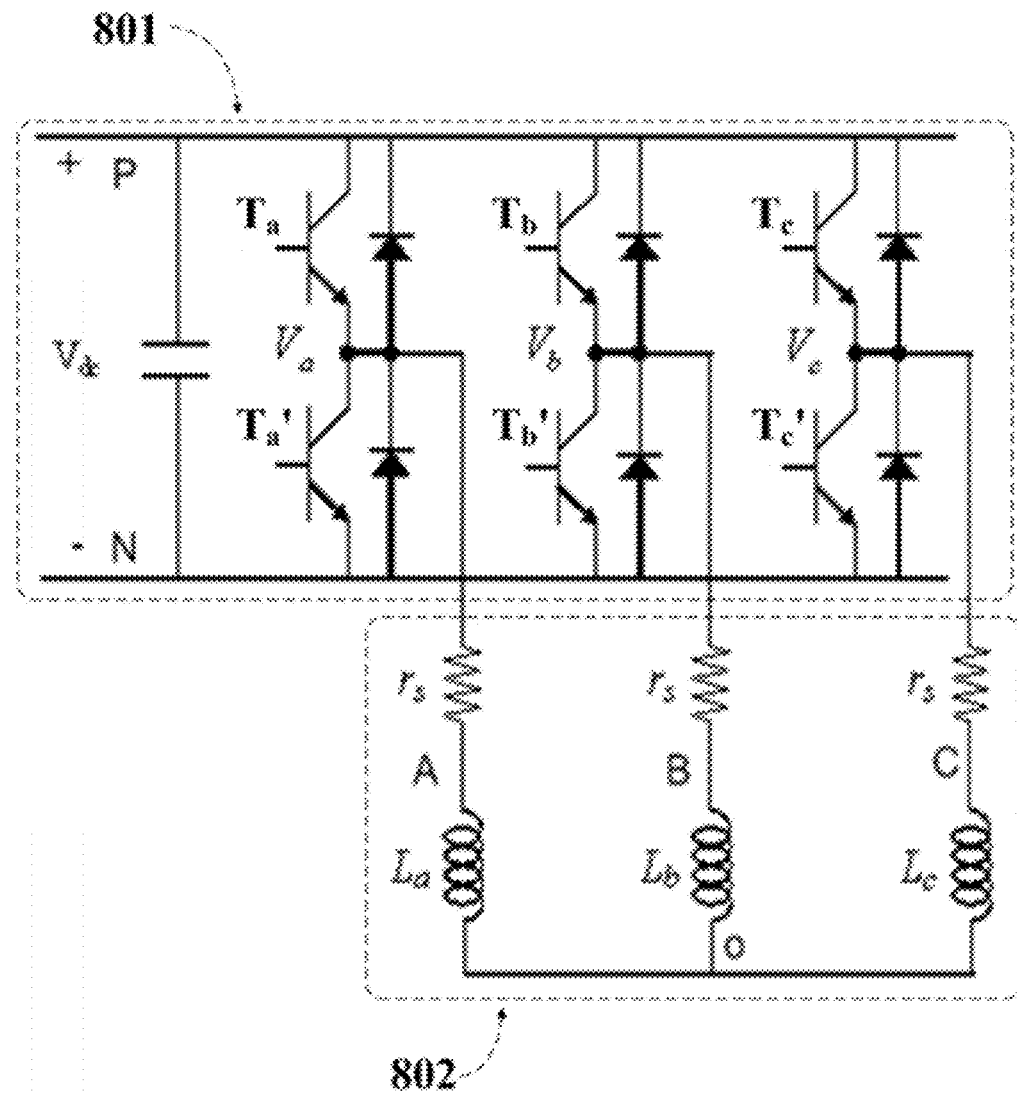
FIG. 8 is a schematic diagram of a general three-phase inverter circuit.

FIG. 7 is a circuit diagram in which the controller 103 generates a boosting signal PB.

As illustrated in FIG. 7, at least one example embodiment provides the controller 103 that may include a voltage controller 1031 and a PWM signal generator 1032. The voltage controller 1031 is capable of determining a duty ratio DPB of the boosting signal PB based on output voltage UB of the booster circuit 101 and target voltage UM. The target voltage UM is, for example, voltage UM required by the three-phase motor 300, and is obtained by multiplying a preset target duty ratio DM by the output voltage Udc of the DC power supply 104. The PWM signal generator 1032 generates the boosting signal PB based on the duty ratio DPB and provides the boosting signal PB to the booster circuit 101 to control boosting of the booster circuit 101.

As illustrated in FIG. 7, at least one example embodiment is configured as follows: a signal obtained by multiplying a peak value DM of the preset target duty ratio by the output voltage Udc of the DC power supply 104 is set as a voltage control command; the output voltage UB fed back from the booster circuit 101 is subtracted to obtain a voltage error; the voltage controller 1031 calculates the duty ratio DPB of the boosting signal PB based on the voltage error; and the PWM signal generator 1032 compares the duty ratio DPB with a triangular wave signal to generate the boosting signal PB.

The controller 103 may be configured to determine a duty ratio of the switching signal PI by determining which two space voltage vectors and their respective continuation times are required according to a phase of voltage required for the three-phase motor, and to generate the switching signal PI by comparing the duty ratio with another triangular wave signal. The switching signal PI is generated by a triangular wave with a frequency that may be uncorrelated with a frequency of a triangular wave that generates the boosting signal PB.

At least one example embodiment provides the controller 103 that is further capable of determining whether or not the booster circuit 101 is in the boosted state. For example, as illustrated in FIG. 1, the controller 103 is capable of detecting the output voltage UB of the booster circuit 101 and the output voltage Udc of the DC power supply 104, and determines that the booster circuit 101 is in the boosted state when the output voltage UB is higher than the output voltage Udc of the DC power supply 104 and lower than the voltage UM required for the three-phase motor 200. Otherwise, it is determined that the booster circuit 101 is not in the boosted state. The controller 103 controls the inverter 102 by, for example, the conventional seven-stage SVPWM switching method or the five-stage SVPWM switching method when the booster circuit 101 is a boosted state circuit.

Figure 11:
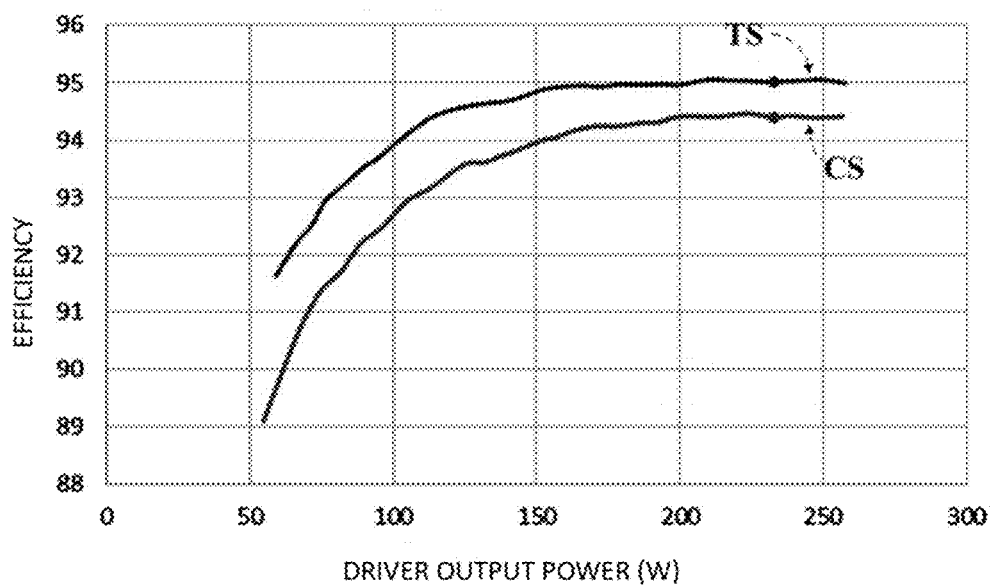
FIG. 11 is a schematic diagram comparing efficiency of applying the power converter according to an example embodiment of the present application to a motor drive device with efficiency of applying the power converter controlled using the conventional seven-stage SVPWM switching method to the same motor driver.

FIG. 11 is a schematic diagram comparing efficiency of applying the power converter according to the example embodiment of the present application to a motor drive device with efficiency of applying the power converter controlled using the conventional seven-stage SVPWM switching method to the same motor driver. FIG. 11 illustrates a curve TS corresponding to efficiency of the two-stage SVPWM switching method of the present application, and a curve CS corresponding to efficiency of the conventional seven-stage SVPWM switching method, where the curve TS is acquired by measuring the efficiency of applying the power converter of the example embodiment of the present application to a motor drive device to control one AC permanent magnet synchronous motor, and the curve CS is acquired by measuring the efficiency of similarly applying a power converter controlled by the conventional seven-stage SVPWM switching method to the motor drive device to control the AC permanent magnet synchronous motor. As can be seen from the foregoing, the efficiency of the two-stage SVPWM switching method of the present application is clearly higher than the efficiency of the conventional seven-stage SVPWM switching method.

According to the example embodiment of the present application, the two-stage space vector pulse modulation method is configured by switching no switching element in two phases in the three-phase switching circuit of the inverter in one pulse width modulation cycle and turning on only the switching element in the other one phase in the one pulse width modulation cycle. This configuration enables driver efficiency to be improved by reducing switching loss of the inverter switch to $2/3$.

An electric apparatus according to a second example embodiment includes the power converter according to the first example embodiment and a three-phase motor, and the power converter supplies power to each phase of the three-phase motor. The features of the power converter have been described in detail in the first example embodiment, so that the contents thereof will be eliminated here. An application field and/or an application scene of the electric apparatus of the example embodiment of the present application are not limited. For example, the electric apparatus may be applied to application scenes of an AC motor drive device, a DC/AC power converter, and the like. The electric apparatus may be used, for example, in a drive device using a battery as a power source, such as for an electric vehicle, a robot arm, or the like, or in a high-speed air conditioner, compressor device, or the like. Alternatively, the electric apparatus may be used in a home appliance such as a water server, a washing machine, a vacuum cleaner, a compressor, a blower, and a stirrer, or may be used as an electric apparatus in another field.

According to the example embodiment of the present application, the power converter provides the two-stage space vector pulse modulation method that is configured by switching no switching element in two phases in the three-phase switching circuit of the inverter in one pulse width modulation cycle and turning on only the switching element in the other one phase in the one pulse width modulation cycle. This configuration enables switching loss of the inverter switch to be reduced to $2/3$, so that driver efficiency is improved to improve efficiency of the electric apparatus.

Although the present application has been described above with reference to the specific example embodiments, it is apparent to those skilled in the art that these descriptions are exemplary and do not limit the protection scope of the present application. Various changes and modifications may be made to the present application by those skilled in the art based on the spirit and the principles of the present application, and these changes and modifications are also within the scope of the present application.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A power converter to supply power to each phase of a three-phase motor, the power converter comprising:
    a booster circuit connected to a DC power supply to boost an input voltage received from the DC power supply based on a pulse width modulation boosting signal;
    an inverter connected to the booster circuit and including a three-phase switching circuit including a plurality of switches; and
    a controller to output a pulse width modulation boosting signal to the booster circuit; wherein
    the inverter further includes an output connected to the three-phase switching circuit to supply power to each phase of the three-phase motor; and
    when the controller detects that the booster circuit is in a boosted state, the controller is configured or programmed to output a pulse width modulation switching signal to the inverter to cause only one arm of the three-phase switching circuit to be turned on in one pulse width modulation cycle of the pulse width modulation switching signal.

2. The power converter according to claim 1, wherein when the controller detects that the booster circuit is in a boosted state, the controller is configured or programmed to control a switch of another single phase in the switching circuit to switch between on and off of the switch in the one pulse width modulation cycle.

3. The power converter according to claim 2, wherein
    the three-phase switching circuit includes six switches defining three arms of a bridge circuit in pairs;
    the three arms correspond to three respective phases of the three-phase motor;
    two switches of each arm define an upper arm and a lower arm of the arm; and
    when the controller detects that the booster circuit is in a boosted state, the controller is configured to control on and off switching of the upper arm and the lower arm of one arm of the three arms in the one pulse width modulation cycle, and cause the upper arm and the lower arm of each of two remaining arms of the three arms not to be turned on in the one pulse width modulation cycle, and the controller is configured or programmed to then cause not only the upper arm of one of the two remaining arms to be turned on and the lower arm of the one to be turned off, but also the upper arm of the other one of the other two arms to be turned off and the lower arm of the other one to be turned on.

4. The power converter according to claim 3, wherein in the one pulse width modulation cycle, the controller is configured or programmed to once control on and off switching of the upper arm and the lower arm of the one arm.

5. The power converter according to claim 3, wherein the controller is configured or programmed to set a duty ratio of the pulse width modulation switching signal based on output voltage of the booster circuit, and to control on and off switching of the upper arm and the lower arm of the one arm based on the duty ratio.

6. The power converter according to claim 1, wherein
    the controller includes a voltage controller and a pulse width modulation signal generator;
    the voltage controller is configured or programmed to determine a duty ratio of the pulse width modulation boosting signal based on an output voltage and a target voltage of the booster circuit;
    the target voltage is obtained by multiplying the input voltage received from the DC power supply that is preset; and
    the pulse width modulation signal generator is configured or programmed to generate the pulse width modulation boosting signal based on the duty ratio and provide the pulse width modulation boosting signal to the booster circuit to control boosting of the booster circuit.

7. The power converter according to claim 1, further comprising:
    a DC power supply to supply a DC voltage to the booster circuit.

8. An electric apparatus comprising:
    the power converter according to claim 1; and
    a three-phase motor;
    the power converter supplying power to each phase of the three-phase motor.

* * * * *